US008848708B2

(12) United States Patent
Huang et al.

(10) Patent No.: US 8,848,708 B2
(45) Date of Patent: Sep. 30, 2014

(54) METHOD, APPARATUS AND SYSTEM FOR PACKET PROCESSING

(75) Inventors: Bin Huang, Shenzhen (CN); Zhiyong Yan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 13/526,068

(22) Filed: Jun. 18, 2012

(65) Prior Publication Data

US 2012/0257623 A1  Oct. 11, 2012

Related U.S. Application Data

(63) Continuation of application No. PCT/CN2010/075786, filed on Aug. 9, 2010.

(30) Foreign Application Priority Data

Dec. 18, 2009 (CN) .......................... 2009 1 0260629

(51) Int. Cl.
*H04L 12/28* (2006.01)
*H04L 29/06* (2006.01)
*H04L 12/713* (2013.01)
*H04L 12/54* (2013.01)

(52) U.S. Cl.
CPC ............ *H04L 12/56* (2013.01); *H04L 63/0263* (2013.01); *H04L 45/586* (2013.01); *H04L 63/0236* (2013.01); *H04L 63/101* (2013.01); *H04L 63/1466* (2013.01); *H04L 63/126* (2013.01); *H04L 63/162* (2013.01)
USPC ........................................................ 370/390

(58) Field of Classification Search
CPC ..... H04L 12/18; H04L 12/56; H04L 29/0653; H04L 45/02; H04L 2012/5618; H04W 24/00
USPC .............. 370/389, 390, 392, 400, 401, 395.3, 370/395.31, 252, 254
See application file for complete search history.

(56) References Cited

U.S. PATENT DOCUMENTS

2003/0037165 A1* 2/2003 Shinomiya .................... 709/238
2004/0008694 A1* 1/2004 Guo ........................ 370/395.52
(Continued)

FOREIGN PATENT DOCUMENTS

CN    101009643 A    8/2007
CN    101035058 A    9/2007
(Continued)

OTHER PUBLICATIONS

Written Opinion of the International Searching Authority dated Nov. 11, 2010 in connection with International Patent Application No. PCT/CN2010/075786.

(Continued)

*Primary Examiner* — Anh Ngoc Nguyen

(57) ABSTRACT

The present invention relate to a packet processing method, an access device, and a communication system. The method includes: receiving, by an access device, a multicast packet from a network side via a first network port of the access device; identifying, by the access device, a protocol type of the multicast packet; if identifying that the multicast packet is a virtual router redundancy protocol packet, sending the virtual router redundancy protocol packet via a second network port of the access device to the network side according to a snooping port list used for forwarding the virtual router redundancy protocol packet; and if identifying that the multicast packet is a non-virtual router redundancy protocol packet, sending the non-virtual router redundancy protocol packet via a user port of the access device to a user side.

10 Claims, 2 Drawing Sheets

(56) References Cited

U.S. PATENT DOCUMENTS

| | | |
|---|---|---|
| 2005/0226144 A1 | 10/2005 | Okita |
| 2005/0281191 A1 | 12/2005 | McGee et al. |
| 2007/0230472 A1 | 10/2007 | Jesuraj |
| 2009/0016215 A1 | 1/2009 | Nadas et al. |
| 2010/0098082 A1* | 4/2010 | Sampath et al. .............. 370/392 |

FOREIGN PATENT DOCUMENTS

| | | |
|---|---|---|
| CN | 101159701 A | 4/2008 |
| CN | 101159741 A | 4/2008 |
| CN | 101741742 A | 6/2010 |

OTHER PUBLICATIONS

International Search Report dated Nov. 11, 2010 in connection with International Patent Application No. PCT/CN2010/075786.

Supplementary European Search Report dated Dec. 12, 2012 in connection with European Patent Application No. EP 10 83 6969.

* cited by examiner

METHOD, APPARATUS AND SYSTEM FOR PACKET PROCESSING

CROSS-REFERENCE TO RELATED APPLICATIONS

This application is a continuation of International Application No. PCT/CN2010/075786, filed on Aug. 9, 2010, which claims priority to Chinese Patent Application No. 200910260629.9, filed on Dec. 18, 2009, both of which are hereby incorporated by reference in their entireties.

TECHNICAL FIELD

The present invention relates to the field of communications technologies, and in particular, to a packet processing method, an access device, and a communication system.

BACKGROUND

In a network application, in order to communicate with networks indifferent network segments, a host needs to set a default gateway, and only via the default gateway can all packets of a network segment be forwarded to other network segments. When the gateway has a failure, communications between the whole host and external networks are interrupted. In a virtual router redundancy protocol (Virtual Router Redundancy Protocol, VRRP for short), the backup of a next-hop gateway can be implemented only by configuring a very few pieces of commands on a related router instead of changing a networking condition or performing any configuration on the host, and further no burden is brought to the host. Compared with the other methods, the VRRP has advantages, such as simple configuration, convenient management, and no need of extra supporting added to the host.

In an application process of the VRRP, a master (master) router is selected from a plurality of routers via a priority. Only the master router can send a VRRP packet, and the other backup (backup) routers are prohibited from sending a VRRP packet. When receiving a VRRP packet with a higher priority than that of the master router, the master router changes from a master state to a backup state, no longer sends the VRRP packet, and discards all datagrams with destination media access control (Media Access Control, MAC for short) addresses being virtual router MAC addresses. The VRRP only needs to be run on a router, and when a host is converged to the router by an access device, the access device sends a VRRP packet from an inbound port connected to the router as an ordinary service packet to an outbound port connected to the host, where the inbound port and the outbound port are not limited and the VRRP packet can be received by a user accessing the Internet.

In the prior art, in a downlink forwarding direction of the access device, as the destination MAC address of the VRRP packet is a multicast address, the access device directly forwards, in a multicast manner, the VRRP packet from the inbound port connected to the router as the ordinary service packet to the outbound port connected to the host and to each user accessing the Internet on the user side, that is, the host. After receiving the VRRP packet, the user accessing the Internet can modify the priority of the VRRP packet to be the highest, and then send the VRRP packet to the network side. Moreover, the VRRP packet, whose priority is modified by the user accessing the Internet, can enable the actual master router to be changed from the master state to the backup state and no longer to forward a service packet, so that services of users accessing the Internet under the whole virtual router are interrupted, thereby affecting the network security.

SUMMARY

Embodiments of the present invention provide a packet processing method, an access device, and a communication system, to solve the problem that the network security and the service running are affected after a user receives a VRRP packet, thereby enhancing the network security, and ensuring the normal service running.

An embodiment of the present invention provides a packet processing method of an access device, including:

receiving, by the access device, a multicast packet from a network side via a first network port of the access device;

identifying, by the access device, a protocol type of the multicast packet;

if identifying that the multicast packet is a virtual router redundancy protocol packet, sending the virtual router redundancy protocol packet via a second network port of the access device to the network side according to a snooping port list used for forwarding the virtual router redundancy protocol packet, where the snooping port list is recorded with port information including information of the first network port and information of the second network port; and if identifying that the multicast packet is a non-virtual router redundancy protocol packet, sending the non-virtual router redundancy protocol packet via a user port of the access device to a user side.

An embodiment of the present invention further provides an access device, including:

at least two network ports, configured to connect devices on a network side;

a user port, configured to connect a user terminal;

an identifying unit, configured to identify a protocol type of a multicast packet received from a first network port; and a processing unit, configured to, when the multicast packet is a virtual router redundancy protocol packet, send the virtual router redundancy protocol packet via a second network port to the network side according to a snooping port list, and when the multicast packet is a non-virtual router redundancy protocol packet, send the non-virtual router redundancy protocol packet via the user port to a user side, where the snooping port list is recorded with port information including information of the first network port and information of the second network port.

An embodiment of the present invention further provides a communication system, including an access device, where the access device is set with a first network port and a second network port; and the access device is configured to receive a multicast packet from a network side via the first network port; identify a protocol type of the multicast packet, and if the multicast packet is a virtual router redundancy protocol packet, send the virtual router redundancy protocol packet via the second network port to the network side according to a snooping port list, and if the multicast packet is a non-virtual router redundancy protocol packet, send the non-virtual router redundancy protocol packet via a user port to a user side, where the snooping port list is recorded with port information including information of the first network port and information of the second network port.

The embodiments of the present invention provide the packet processing method, the access device, and the communication system. A snooping port connected to a first router receives a VRRP packet, and the VRRP packet is forwarded to a snooping port connected to a second router, so that it can be prevented that the access device broadcasts the VRRP packet to all users, to save network bandwidth, and further, it can be prevented that the VRRP packet is snooped by a user and is constructed into a VRRP packet with a higher priority to attack a router. Therefore, the network security can be enhanced and the normal service running can be ensured.

DETAILED DESCRIPTION

Technical solutions of the present invention are further described in detail through the accompanying drawings and embodiments in the following.

Figure 1:
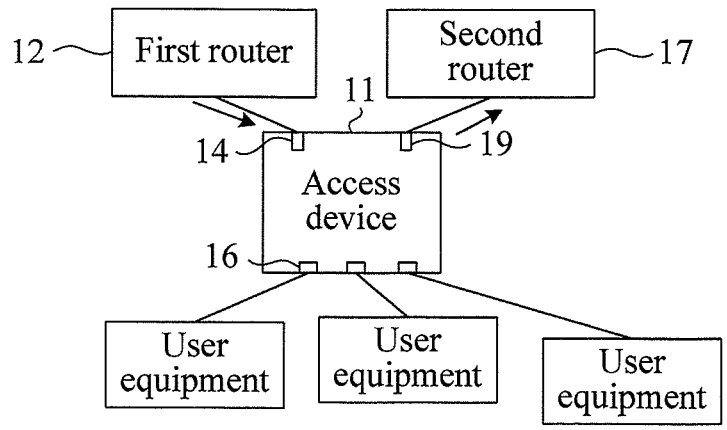
FIG. 1 is a schematic diagram of a network architecture according to an embodiment of the present invention.

FIG. 1 is a schematic diagram of a network architecture in an embodiment of the present invention, and an access device 11 and two routers are included. It can be known by persons of ordinary skill in the art that, one or more than two routers may also be applied, and the router(s) connected to the access device 11 can form a virtual router. The access device 11 is connected via a port 14 (a first network port) to a first router 12, and is connected via a port 19 (a second network port) to a second router 17. In the embodiment of the present invention, the first router 12 can be a master router, capable of sending a VRRP packet, and the second router 17 can be a backup router, capable of receiving the VRRP packet. In addition, in the embodiment of the present invention, a port, on the access device, connected to the virtual router is a snooping port, for example, a port 14 and a port 19 in FIG. 1. Here, the virtual router refers to a virtual router that is formed by a part of or all of the routers connected to the access device 11 during networking. The port connected to a user equipment is called a non-snooping port, for example a port 16.

An embodiment of the present invention provides a packet processing method. The provided method can prevent a VRRP packet received from a snooping port from being forwarded to a user port.

Figure 2:
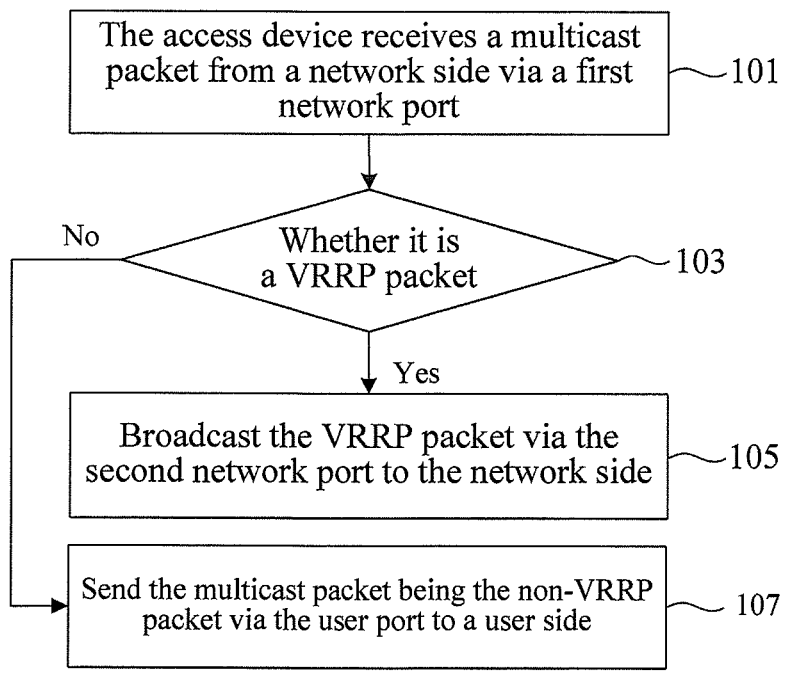
FIG. 2 is a schematic flowchart of a packet processing method according to an embodiment of the present invention.

FIG. 2 is a schematic flowchart of a packet processing method provided in the embodiment of the present invention. The packet processing method includes the following steps.

Step 101: An access device receives a multicast packet from a network side via a first network port.

The multicast packet includes a multicast packet whose destination address is a multicast group address and a broadcast packet whose destination address does not point to a special user, and may be a VRRP packet, an address resolution protocol (Address Resolution Protocol, APR for short) packet, a TCP/IP packet, a user datagram protocol (User Datagram Protocol, UDP for short) packet, an Internet group management protocol (Internet Group Management Protocol, IGMP for short) packet, and the like.

Step 103: The access device identifies whether a protocol type of the multicast packet is a VRRP packet. If being the VRRP packet, step 105 is performed, and if being a non-VRRP packet, step 107 is performed.

Step 105: The access device sends the received VRRP packet via the second network port to the network side according to a snooping port list, so that the packet can arrive at the second router.

The snooping port list is recorded with port information of the snooping port of the access device, including one or more pieces of information, such as a port identifier, a frame location of the port on the access device, and a slot location of the port on the access device.

The second network port can be one or more snooping ports. After receiving the VRRP packet, the access device broadcasts the VRRP packet to other snooping ports in the snooping port list.

If the port at which the VPPR packet is received is a non-snooping port, that is, the port at which the VRRP packet is received is not in the snooping port list, the access device can discard the VRRP packet.

Step 107: The access device sends the multicast packet being the non-VRRP packet via the user port to a user side.

When the multicast packet is the non-VRRP packet, the access device broadcasts the multicast packet to the user port. The non-VRRP packet may be the ARP packet, the TCP/IP packet, the UPD packet, the IGMP packet, and the like.

In this embodiment, the snooping port list can be pre-saved, and can also be updated in real time according to a connection state.

In the step 105, the first network port can also directly forward the VRRP packet to the second network port, and then the VRRP packet is sent to the second router through the second network port.

In addition, in order to prevent a downlink service packet from being broadcasted between snooping ports, for example, the first network port and the second network port, isolation can also be set between the snooping ports. For example, a snooping port is set to be a port prohibited from automatically forwarding a service packet. In this way, after receiving the VRRP packet, the snooping port does not directly send the VRRP packet to another snooping port, but forwards the VRRP packet among a plurality of routers via the snooping ports of the access device, so as to avoid a broadcast storm which is caused when the access device cannot refresh a layer-2 forwarding entry and cannot perform self-learning of a layer-2 MAC address.

In this embodiment, the VRRP packet from the network side is received through the first network port of the access device. If the first network port is a snooping port, the VRRP packet is sent to an upper-layer network via the second network port according to the snooping port list. In this way, it can be prevented that the access device broadcasts the VRRP packet to all users, so as to save network bandwidth; and it can also be prevented that the VRRP packet is snooped by a user and is constructed into a VRRP packet with a higher priority to attack the router, so as to enhance the network security and ensure the normal service running. In addition, by prohibiting the service packet from being forwarded automatically between the snooping ports, the broadcast storm that occurs when the access device cannot perform the self-learning of the layer-2 MAC address can be avoided, and a VRRP protocol can be run normally among a plurality of routers when the uplink snooping ports of the access device cannot perform layer-2 interworking.

Figure 3:
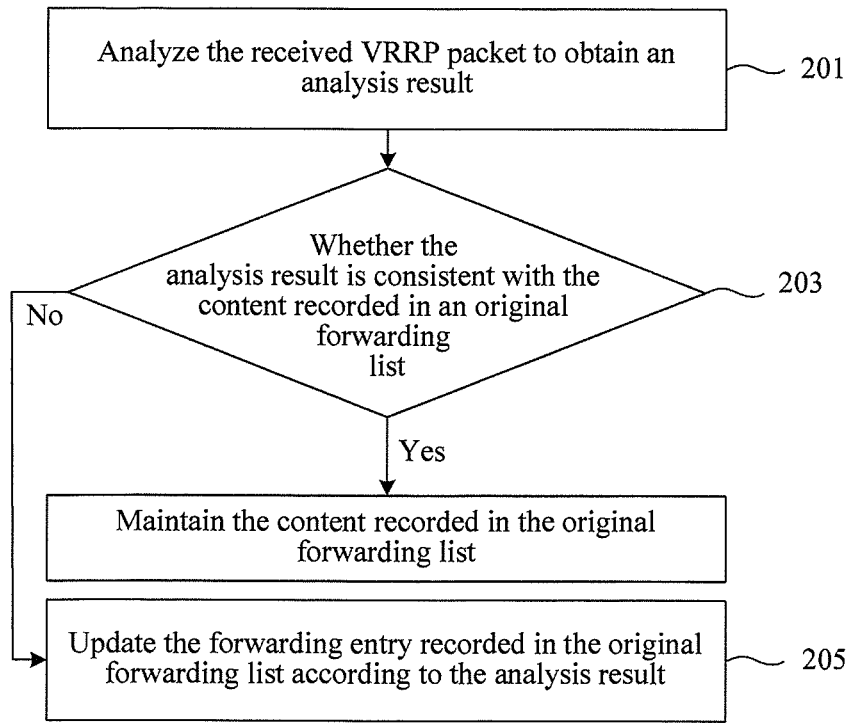
FIG. 3 is a flowchart of processing an original forwarding record list by an access device in a packet processing method according to another embodiment of the present invention.

In another embodiment of the present invention, after receiving the VRRP packet via the first network port, the access device can further process an original forwarding entry. FIG. 3 is a flowchart of processing an original forwarding record list by the access device in the packet processing method provided by the embodiment of the present invention, which includes the following steps.

Step 201: Analyze the received VRRP packet to obtain an analysis result.

The analysis result includes a virtual router IP, a virtual router media access control address, a virtual local area network identifier, and information of a port at which a virtual router redundancy protocol packet is received.

The analysis result may be represented by an analysis entry, that is, the analysis result of a piece of VRRP packet is recorded as an entry in an analysis list.

Step 203: Determine whether the analysis result is consistent with the content recorded in an original forwarding list. If being consistent, maintain the content recorded in the original forwarding list, and if being inconsistent, perform the step 205.

Step 205: Update the forwarding entries recorded in the original forwarding list according to the analysis result, where the forwarding entries includes a layer-2 forwarding entry and a layer-3 forwarding entry.

Specifically, the access device updates the layer-2 forwarding entry according to the virtual router IP, the virtual router media access control address MAC, the virtual local area network identifier VLAN, and the information of the port at which the VRRP packet is received, and updates the layer-3 forwarding entry according to the virtual router MAC, the VLAN, and the information of the port at which the VRRP packet is received. The layer-2 forwarding entry may be a forwarding entry of a layer-2 MAC address list, and the layer-3 forwarding entry may be an entry of a layer-3 ARP list.

Further, if the access device receives the virtual router redundancy protocol packet and an address resolution protocol packet at the same time, the access device updates, preferentially according to the address resolution protocol packet, the content recorded in the original forwarding list.

In the embodiment of the present invention, when the access device receives the VRRP packet and the ARP packet at the same time, the access device can update, preferentially according to the ARP packet, the original forwarding record list. When the access device receives no ARP packet, the access device can also update the original forwarding record list according to the received VRRP packet, so as to ensure the updating of a layer-3 forwarding entry, so that the instantaneity of the first router connected to the snooping port of the access device can be ensured, and an uplink service packet can be forwarded to a latest master router. Since the interval of the VRRP packet is far shorter than that of the ARP packet, the service interruption time can be shortened, the normal service running can be ensured, and the packet loss ratio of the datagrams of the virtual router MAC address can be reduced. When a plurality of routers performs VRRP load sharing networking, a broadcast storm which is caused when the access device cannot perform the self-learning of the layer-2 MAC address entry can be prevented, and bandwidth resources can be saved.

Figure 4:
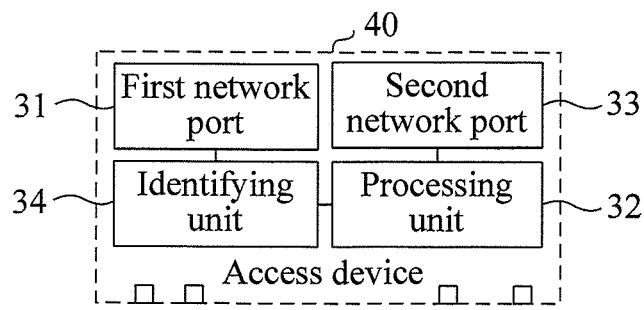
FIG. 4 is a schematic structural diagram of an access device according to an embodiment of the present invention.

An embodiment of the present invention provides an access device. FIG. 4 is a schematic structural diagram of the access device provided by the embodiment of the present invention. The access device 40 may include: at least two network ports, configured to connect devices on a network side, and a user port, configured to connect a user terminal.

Specifically, the access device 40 may include: a first network port 31, an identifying unit 34, a processing unit 32, and a second network port 33.

The first network port 31 is configured to receive a multicast packet from a network side.

The identifying unit 34 is configured to identify a protocol type of the multicast packet.

The processing unit 32 is configured to, when the multicast packet is a virtual router redundancy protocol packet, send the virtual router redundancy protocol packet via the second network port 33 to the network side according to a snooping port list; and when the multicast packet is a non-virtual router redundancy protocol packet, send the non-virtual router redundancy protocol packet via the user port to a user side. The snooping port list is recorded with port information including information of the first network port 31 and information of the second network port 33.

In this embodiment, the first network port 31 can connect a master router, and the second network port 33 can connect a backup router.

The processing unit 32 is further configured to analyze the received virtual router redundancy protocol packet to obtain an analysis entry, determine whether the analysis entry is consistent with the content recorded in an original forwarding list; and if being consistent, maintain the content recorded in the original forwarding list, and if being inconsistent, update, according to the analysis entry, the content recorded in the original forwarding list.

The processing unit 32 is further configured to, when the multicast packet is an address resolution protocol packet, update, according to the address resolution protocol packet, the content recorded in the original forwarding list.

In this embodiment, after receiving a VRRP packet from the first router, the access device can forward the VRRP packet to other snooping ports according to the snooping port list, so that it can be prevented that the access device broadcasts the VRRP packet to all users, so as to save network bandwidth. Moreover, it can be prevented that the VRRP packet is snooped by a user and is constructed into a VRRP packet with a higher priority to attack a router, so as to enhance the network security and ensure the normal service running.

An embodiment of the present invention provides a communication system, including an access device, where the access device is set with a first network port and a second network port.

The access device is configured to receive a multicast packet from a network side via the first network port; identify a protocol type of the multicast packet, and if the multicast packet is a VRRP packet, send the VRRP packet via the second network port to the network side according to a snooping port list, and if the multicast packet is a non-VRRP packet, send the non-VRRP packet via a user port to a user side. The snooping port list is recorded with port information including information of the first network port and information of the second network port.

Moreover, the access device is further configured to, if receiving the VRRP packet and an ARP packet at the same time, update, preferentially according to the ARP packet, the content recorded in an original forwarding list.

In this embodiment, the access device receives the VRRP packet from the network side. The VRRP packet can be forwarded to the network side via the second network port. The first network port and the second network port are snooping ports. In this way, it can be prevented that the access device broadcasts the VRRP packet to all users, so as to save network bandwidth, and in addition, it can be prevented that VRRP packet is snooped by a user and is constructed into a VRRP packet with a higher priority to attack a router, so as to enhance the network security and ensure the normal service running.

Persons of ordinary skill in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as an ROM, an RAM, a magnetic disk, or a compact disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments or equivalent replacements can be made to some technical features in the technical solutions, and such modifications or replacements cannot make the essence of the corresponding technical solutions depart from the scope of the technical solutions of the embodiments of the present invention.

What is claimed is:

1. A packet processing method on an access device, the method comprising:
   receiving, by the access device, a multicast packet from a network side via a first network port of the access device;
   identifying, by the access device, a protocol type of the multicast packet;
   if identifying that the multicast packet is a virtual router redundancy protocol packet, sending the virtual router redundancy protocol packet via a second network port of the access device to the network side according to a snooping port list used for forwarding the virtual router redundancy protocol packet, wherein the snooping port list is recorded with port information comprising information of the first network port and information of the second network port; and
   if identifying that the multicast packet is a non-virtual router redundancy protocol packet, sending the non-virtual router redundancy protocol packet via a user port of the access device to a user side.

2. The method according to claim 1, if the identifying that the multicast packet is the virtual router redundancy protocol packet, the method further comprising:
   analyzing, by the access device, the virtual router redundancy protocol packet to obtain an analysis result, wherein the analysis result comprises: a virtual router IP, a virtual router media access control address, a virtual local area network identifier, and information of a port at which the virtual router redundancy protocol packet is received; and
   determining whether the analysis result matches a content recorded in an original forwarding list, and if being inconsistent, updating a forwarding entry recorded in the original forwarding list according to the analysis result.

3. The method according to claim 2, wherein the updating the forwarding entry recorded in the original forwarding list according to the analysis result comprises:
   updating a layer-2 forwarding entry according to the virtual router IP, the virtual router media access control address, the virtual local area network identifier, and the information of the first network port at which the virtual router redundancy protocol packet is received in the analysis result;
   updating a layer-3 forwarding entry according to the virtual router media access control address, the virtual local area network identifier, and the information of the first network port at which the virtual router redundancy protocol packet is received.

4. The method according to claim 2, wherein the non-virtual router redundancy protocol packet comprises an address resolution protocol packet, and the method further comprises:
   if identifying that the multicast packet is the address resolution protocol packet used to resolute the virtual router IP, updating, by the access device, the forwarding entry of the original forwarding list according to the address resolution protocol packet.

5. The method according to claim 2, before the receiving, by the access device, the multicast packet from the network side via the first network port of the access device, further comprising:
   setting the first network port to be a port prohibited from automatically forwarding a service packet.

6. An access device, comprising:
   at least two network ports, configured to connect devices on a network side;
   a user port, configured to connect a user terminal;
   an identifying unit, configured to identify a protocol type of a multicast packet received from a first network port; and
   a processing unit, configured to, when the multicast packet is a virtual router redundancy protocol packet, send the virtual router redundancy protocol packet via a second network port to the network side according to a snooping port list; and when the multicast packet is a non-virtual router redundancy protocol packet, send the non-virtual router redundancy protocol packet via the user port to a user side, wherein the snooping port list is recorded with port information comprising information of the first network port and information of the second network port.

7. The access device according to claim 6, wherein the processing unit is further configured to, when the multicast packet is an address resolution protocol packet, update a content recorded in an original forwarding list according to the address resolution protocol packet.

8. The access device according to claim 7, wherein the processing unit is further configured to: analyze the virtual router redundancy protocol packet to obtain an analysis result, wherein the analysis result comprises a virtual router IP, a virtual router media access control address, a virtual local area network identifier, and information of a port at which the virtual router redundancy protocol packet is received; and determine whether the analysis result matches the content recorded in the original forwarding list, and if being inconsistent, update, according to the analysis result, a layer-2 forwarding entry and a layer-3 forwarding entry that are recorded in the original forwarding list.

9. A communication system, comprising:
   an access device, wherein the access device is set with a first network port and a second network port; and
   the access device is configured to receive a multicast packet from a network side via the first network port; identify a protocol type of the multicast packet, and if the multicast packet is a virtual router redundancy protocol packet, send the virtual router redundancy protocol packet via the second network port to the network side according to a snooping port list; and if the multicast packet is a non-virtual router redundancy protocol packet, send the non-virtual router redundancy protocol packet via a user port to a user side, wherein the snooping port list is recorded with port information comprising information of the first network port and information of the second network port.

10. The communication system according to claim 9, wherein the access device is further configured to, when the multicast packet is an address resolution protocol packet, update an original forwarding list according to the address resolution protocol packet.

\* \* \* \* \*